Figure 3:
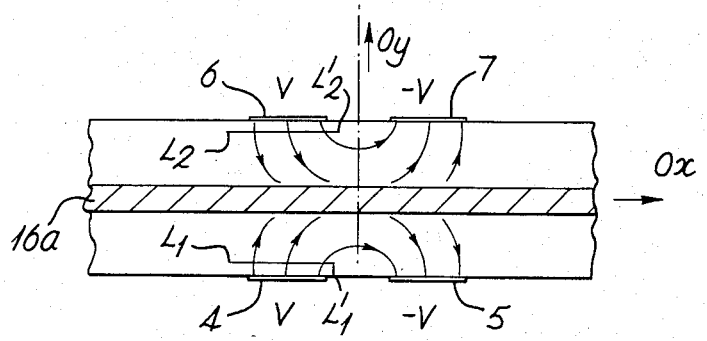

United States Patent [19]

Burdess et al.

[11] Patent Number: 4,489,609
[45] Date of Patent: Dec. 25, 1984

[54] GYROSCOPES

[75] Inventors: James S. Burdess, Tyne and Wear; Leonard Maunder, Newcastle upon Tyne, both of England

[73] Assignee: National Research Development Corporation, London, England

[21] Appl. No.: 447,717

[22] Filed: Dec. 7, 1982

[30] Foreign Application Priority Data

Dec. 8. 1981 [GB] United Kingdom ............... 8137001

[51] Int. Cl.³ .............................. G01C 19/56
[52] U.S. Cl. .................... 73/505; 310/329; 310/333; 310/366
[58] Field of Search ............. 73/505; 310/329, 333, 310/366

[56] References Cited

U.S. PATENT DOCUMENTS

| 2,544,646 | 3/1951 | Barnaby et al. | 73/505 X |
| 2,683,247 | 7/1954 | Wiley | 73/505 X |
| 3,258,617 | 6/1966 | Hart | 73/505 X |
| 3,520,195 | 7/1970 | Tehon | 73/505 |
| 4,079,630 | 3/1978 | Friedland et al. | 73/505 |
| 4,264,838 | 4/1981 | Jacobson | 73/505 X |

FOREIGN PATENT DOCUMENTS

| 601051 | 4/1948 | United Kingdom | 73/505 |
| 1288118 | 9/1972 | United Kingdom | . |
| 1540279 | 2/1979 | United Kingdom | 73/505 |
| 2021266A | 11/1979 | United Kingdom | . |
| 2061502A | 5/1981 | United Kingdom | . |

OTHER PUBLICATIONS

PCT International Application Published under the Patent Cooperation Treaty–International Publication No. WO81/00933, International Publication Date: Apr. 2, 1981, (International Appln. No. PCT/US80/01267-filing date Sep. 22, 1980).

Primary Examiner—James J. Gill
Attorney, Agent, or Firm—Cushman, Darby & Cushman

[57] ABSTRACT

A gyroscopic device comprising a beam, column or other continuous unitary structure of consistent vibratory characteristics along its full length and including piezoelectric material. The piezoelectric effect is used both excite the structure into resonant vibrations along a first axis and then, when a rate of turn is applied along a second axis at right angles to the first, to detect that rate of turn by sensing vibrations set up in the beam in a direction parallel to a third, orthogonal axis due to Coriolis forces resulting from the applied rate of turn. The beam may be held at both ends, or may be supported at one end only with the other end free. The vibrations applied to and sensed within the beam by means of the piezoelectric effect may be parallel, transverse and radial relative to the beam axis, or may be in a rotary sense around that axis. A mode of vibration in which opposite faces of the beam oscillate in parallel directions but out-of-phase is also disclosed.

4 Claims, 13 Drawing Figures

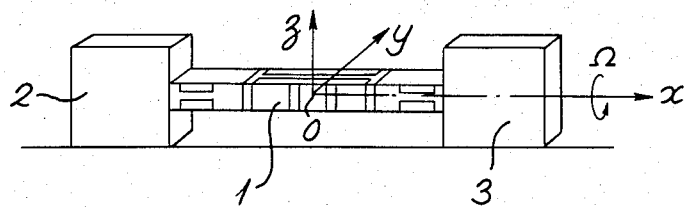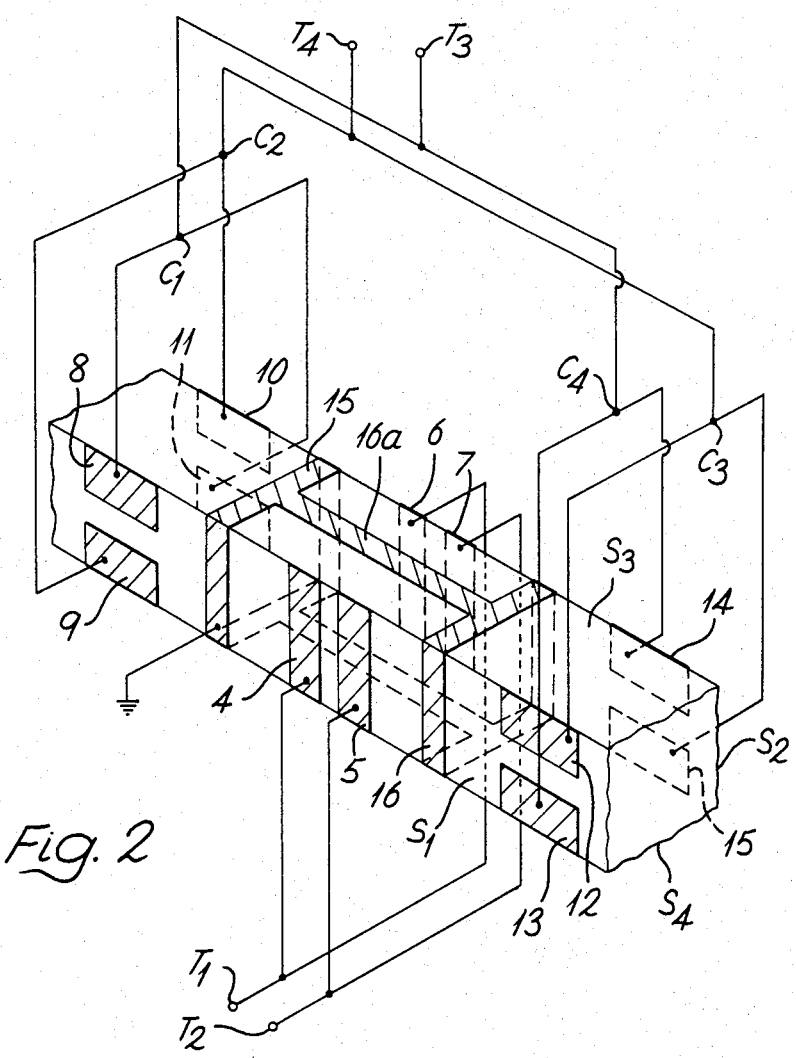

GYROSCOPES

This invention relates to gyroscopes. It relates in particular to oscillatory gyroscopes, by which we mean gyroscopes in which the principal moving element is not a rotor but rather a beam or other structure maintained in high frequency oscillation.

The concept of the oscillatory gyroscope was first proposed and published many years ago, and it was appreciated from the start that such designs of gyroscope had the capacity to act as rate of turn sensors, in a manner analogous to that of the traditional rotor gyro. With the latter, when a rate of turn is applied about one of the two orthogonal axes lying at right angles to the rotor axis, inertia forces are generated by the Coriolis effect along the remaining orthogonal axis: by sensing these forces a measure of the applied rate of turn may be derived. In principle the operation of an oscillatory gyroscope is similar, with the axis of oscillation substituted for the rotor axis.

In the earliest oscillatory gyroscopes, and indeed in their successors until recent times, it has been common practice for the oscillatory element to be of known and mechanical kind, for instance a tuning fork. Typically this was set by electrostatic or electromagnetic means into vibration at a frequency of the order of a few kHz.

Recently it has been appreciated that the piezoelectric effect might be used to excite suitable crystalline structures into vibrations of much smaller amplitude but higher velocity, with the apparent potential of generating much higher Coriolis inertia forces and thus more useful signals. However this potential advantage has been largely outweighed, so far, by the complexity of construction that has been found to be necessary. For example one piezoelectric type of oscillatory gyroscope now in commercial production is of essentially discontinuous structure and uses two separate wafer-type members of p.e. crystal with a special joint bridging the discontinuity between them, the plane of the first member being at right angles to the second. The first crystal is maintained in oscillation, and the second crystal acts quite separately as the "sensor" in that the Coriolis inertia forces, set up by an applied rate of turn, set it into vibration in a direction in which the first crystal would not be capable of vibrating.

The present invention arises from appreciating that it is possible, using structures that exhibit the p.e. effect but are of more simple configuration, both to use that effect to set the structure into one mode of vibration and to use it to detect Coriolis forces set up in the same structure when a rate of turn is then applied to it. The more simple structures to which this invention applies are elongated members without substantial discontinuity along their length and will be described as geometrically-consistent structures by which we mean members of a cross-section that is geometrically-consistent—e.g. rectangular, circular, etc.—although possibly variable in dimensions over that length of the structure to which vibrations of one kind are applied and of which vibrations of another kind are sensed.

According to the present invention a gyroscopic device comprises a geometrically-consistent structure exhibiting the piezoelectric effect and supported so as to be capable of vibrating sensibly in at least two planes lying at right angles to each other, in which there are means using the piezoelectric effect to set the structure into resonant oscillation in one of those planes, and in which there are also means using the piezoelectric effect to sense inertia forces generated within the structure and acting within the second plane as a result of the structure being subjected to an applied rate of turn along an appropriate axis.

The structure may be formed from a single crystal of p.e. material, or alternatively may comprise elements of different crystals bonded together.

The structure may comprise a beam of rectangular, say square, cross-section and preferably held at both ends with electrodes mounted against opposite faces of the beam close to the middle of its length whereby to use the p.e. effect to excite the beam into oscillation along an axis parallel to one pair of sides of its rectangular section, and with sensing electrodes located against the beam to detect inertia forces set up by the Coriolis effect, along an axis parallel to the other two faces of the rectangular section, when the beam is subjected to a rate of turn about its longitudinal axis.

Alternatively the structure may comprise a beam or column, preferably of circular cross-section, anchored at one end but with the other end free. Electrodes may be placed on the surface of the structure so as to excite it into resonant oscillation in the form of radial expansion and contraction, and to sense the torsional—that is to say tangential—oscillatory forces that are then set up in the structure when it is subjected to a rate of turn about its longitudinal axis. In this case the magnitude of the tangential oscillatory forces that are to be sensed is proportional to the amplitude of the radial oscillations into which the structure has been set, and that amplitude may be enhanced by making the free end of the structure radially larger than the rest, thus accommodating large electrodes through which relatively high power may be applied to set the structure as a whole into radial oscillation. Conversely the sensing electrodes may with advantage be fixed to the main part of the column which is of lesser radius, because this will respond more readily to the torsional forces generated by the Coriolis effect as the result of an applied rate of turn.

As another alternative the structure could be in the form of a beam supported at both ends, and preferably of rectangular cross-section. However instead of the whole beam being set into a simple single-phase vibration, like a taut string vibrating at its fundamental frequency, the exciting electrodes can be so located around the centre of the beam's length as to set the beam into oscillation of a shearing type, in which a pair of opposite faces of the beam's section oscillate in parallel, transverse directions but out-of-phase with each other. If a rate of turn is now applied in a direction normal both to those transverse directions and to the length of the beam, the Coriolis effect will generate inertia forces acting along the beam's length and giving rise by the p.e. effect to an electrical field that can be sensed by electrodes placed appropriately, preferably also in the central part of the beam's length.

In those embodiments of the invention in which the beam is held at both ends it may with advantage be held encastre, that is to say in a manner suppressing all motions of the beam at the point of holding, but in suitable cases the desired gyroscopic effects may still take place even with one or both ends of the beam less totally secured.

The electrodes which excite the structure into resonant oscillation by reason of its piezoelectric character may be driven by electric circuits employing positive feedback, whereby the amplitude of the vibration so excited tends to a maximum value limited by an active gain control element, e.g. a switch, and by amplifier gain. Conversely the circuitry associated with the electrodes which detect the Coriolis inertia forces may employ negative feedback, so that the electrodes tend to generate their own equal but opposite force and so minimise the strain which the beam undergoes in response to the inertia forces.

Figure 6:
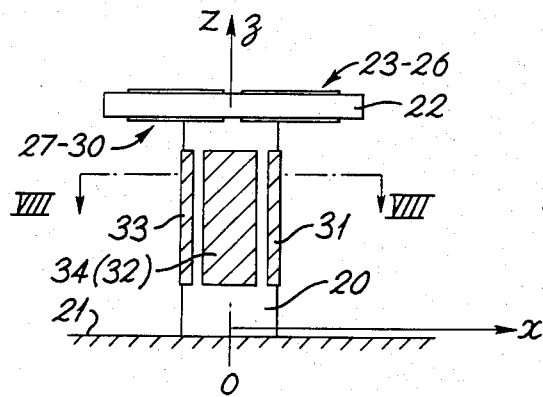
Figure 7:
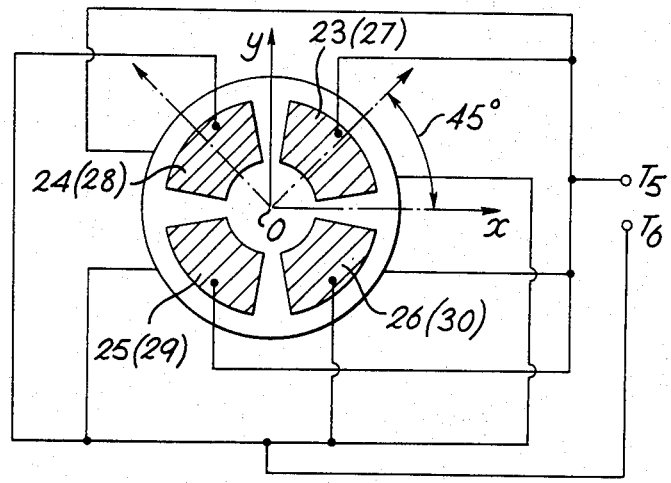
Figure 8:
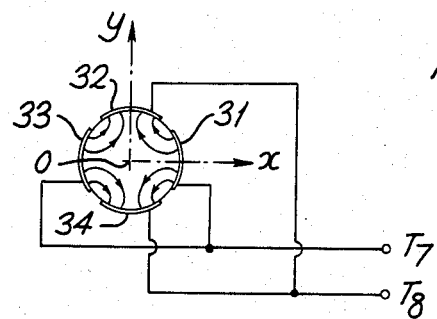
Figure 9:
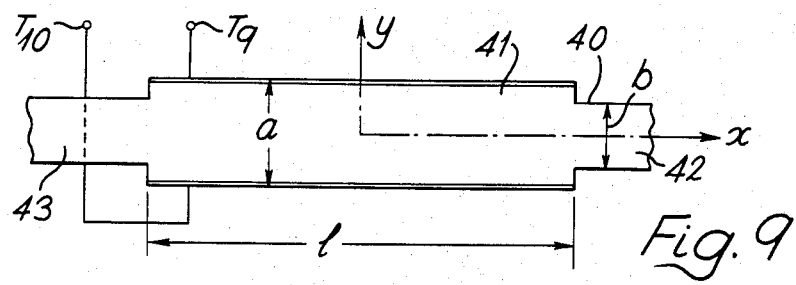
Figure 10:
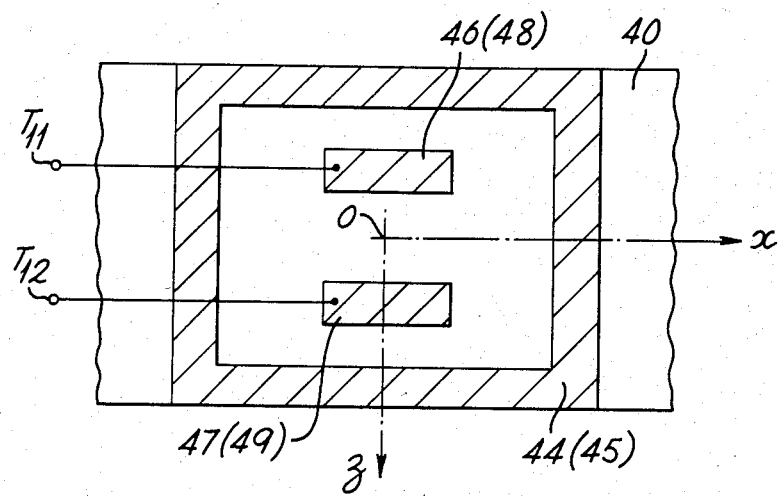
Figure 11:
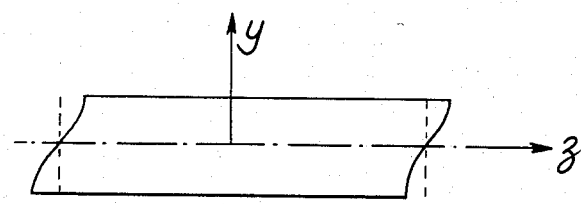
Figure 12:
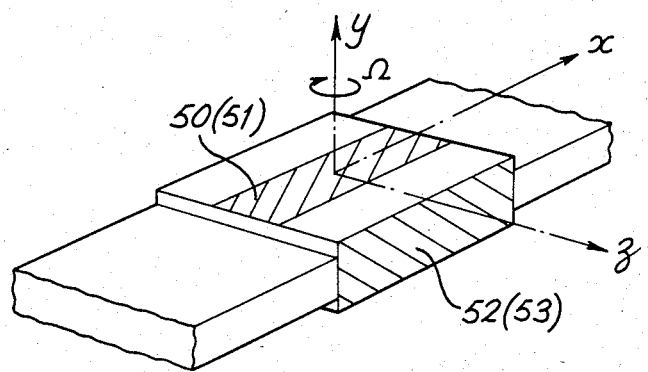
Figure 13:
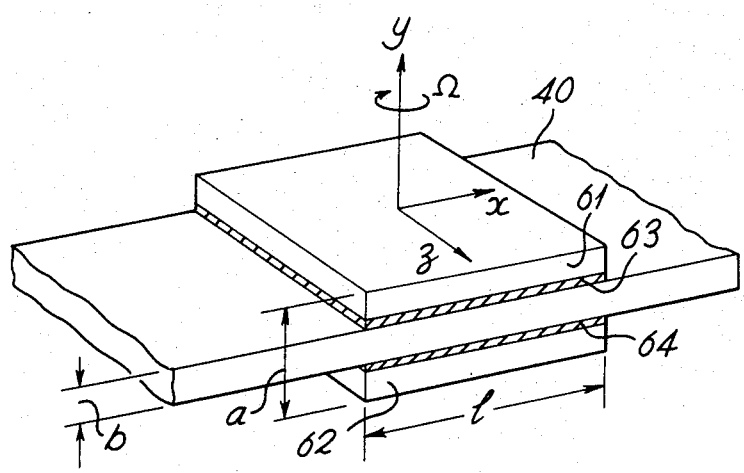

The invention will now be described, by way of example, with reference to the accompanying diagrammatic drawings in which:

FIGS. 1 to 5 show one embodiment of the invention;
FIGS. 6 to 8 show a second embodiment;
FIGS. 9 to 11 show a third embodiment, and
FIGS. 12 and 13 show alternative arrangements to that of FIG. 10.

In FIGS. 1 and 2 the sensitive structure of the device is the beam 1. Blocks 2 and 3 provide support and hold the beam 1 encastre at its ends. The beam is square in cross-section throughout its length and is thus geometrically-consistent in shape, and it is manufactured from a piezoelectric material such as lithium niobate, quartz or bismuth germanium oxide.

Electrode sets deposited on the surface of the beam by vaporisation are used to drive the beam into vibration and to provide voltage signals proportional to an angular rate of turn $\Omega$ applied about the longitudinal axis (Ox) of the beam.

Electrodes 4 and 5 are deposited on the same surface $S_1$ of the beam and are positioned symmetrically on either side of the mid-section at 0. An identical set of electrodes, 6 and 7, is deposited on the opposite surface $S_2$. Electrodes 4 and 6 are joined to a single electrical terminal $T_1$, and a similar terminal $T_2$ joins electrodes 5 and 7.

At the far left hand end of the beam electrodes 8 and 9 are deposited on the surface $S_1$, and positioned symmetrically on either side of the longitudinal centre line. An identical set, 10 and 11, is deposited on the opposite surface $S_2$ and connections $C_1$ and $C_2$ are formed by joining 8 to 11 and 9 to 10. This electrode arrangement is repeated at the far right hand end of the beam and the connections $C_3$ and $C_4$ formed by joining 12 to 15 and 13 to 14. The sets of exciting electrodes 4 to 7 and sensing electrodes 8 to 15 form a symmetrical arrangement about the mid-section of the beam. Terminals $T_3$ and $T_4$ are formed by joining $C_1$ to $C_4$ and $C_2$ to $C_3$.

Electrodes 8 to 15 are shielded from electrodes 4 to 7 by an electrode 16 held at earth potential. The shielding is achieved by making the end regions of 16 form a complete circuit around the beam section. The end regions are joined by two strips 16a located centrally on the top and bottom surfaces $S_3$ and $S_4$; these strips enhance the component of the electrical field that electrodes 4 to 7 produce along axis Oy.

The position and dimensions of the foregoing electrodes are chosen to maximise the electro-mechanical coupling resulting from the piezoelectric character of beam 1.

The central electrodes 4 to 7 and the earthing strips 16a are used to generate an electrical field which is concentrated in the mid-section of the beam. This field is designed to have a significant component in the thickness direction (Oy) of the beam. When a voltage V is applied to terminal $T_1$ and a voltage $-V$ to terminal $T_2$ the field in the region of the mid-section is distributed as shown in FIG. 3 and will, because of the piezoelectric effect, cause the line elements $L_1$ and $L'_1$ at one side of the beam to increase in length and the line elements $L_2$ and $L'_2$ at the other side to contract. As a result of this induced strain the beam will deflect in the Oxy plane with a node at its mid-point O. Further, if these voltages are allowed to vary in a sinusoidal manner at a frequency equal to the natural frequency of the beam a state of resonance can be induced and large beam displacements produced for small values of applied voltage of amplitude V.

Figure 4:
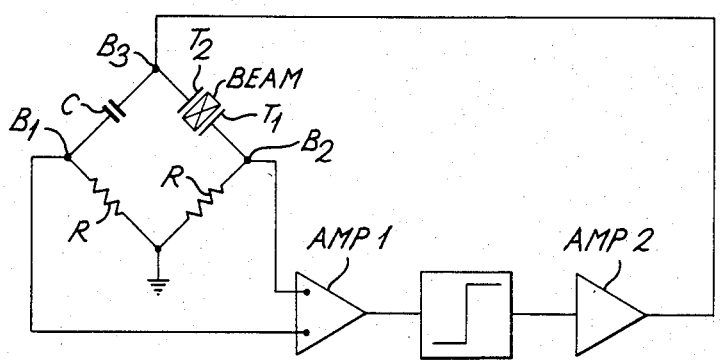

For the beam to function as a gyroscope it is necessary to arrange the beam to be self-driven to resonance and to control the amplitude of the resonant motion. This can be done by making the beam part of an oscillator circuit in which the feedback gain is made amplitude dependent. A possible circuit arrangement is shown in FIG. 4 where the beam, via the terminals $T_1$ and $T_2$ forms one arm in an electrical bridge network. The value of capacitor C is chosen equal to the clamped capacitance of the beam as measured across $T_1$ and $T_2$ and resistors R are chosen according to the criterion $1 \gg \omega \cdot CR$ where $\omega$ is the resonant frequency of the beam in rads/sec. If the potential difference between the bridge points $B_1$ and $B_2$ is measured using a difference amplifier Amp 1, then the amplifier output voltage is proportional to the beam velocity (i.e. rate of change of beam deflection with respect to time). The output of this amplifier then passes through an active gain control element such as a non-linear switch element S to a variable gain amplifier Amp 2, the output of which is then used to form a positive feedback loop around the beam. The loop is closed by feeding the output of Amp 2 to the bridge at point $B_3$. Because of the almost infinite gain of the switch element at small input amplitudes the positive feedback loop ensures that the unstrained beam is dynamically unstable. Therefore when given a small initial disturbance the beam will spontaneously vibrate at its resonant frequency and the amplitude will increase until a limit cycle is reached. The magnitude of this limit cycle is determined by the internal damping of the beam, the gain vs. input amplitude characteristics of the switch element S and the gain of Amp 2. The amplitude of the resonant motion of the beam can be pre-set by any of several techniques well known in the art, for instance by observing the output of Amp 1 and adjusting the gain of Amp 2.

When a rate of turn $\Omega$ is applied about the beam's longitudinal axis Ox, the resonant vibration in the Oxy plane gives rise by reason of the Coriolis effect to inertia forces in the Oz direction. Since the beam cross-section is a square the resonant frequencies for vibration in the Oxy and Oxz planes will be the same, and therefore in the absence of damping these inertia forces will cause the beam to vibrate in a resonant manner in the Oxz plane. This induced motion will cause maximum elastic strain in the regions of the electrodes 8 to 15 and so, because of the piezoelectric effect, will generate a voltage across the terminals $T_3$ and $T_4$. This voltage can be used as an error signal to drive a control loop which will offset the resonance motion induced as a result of the rotation $\Omega$ about Ox.

Figure 5:
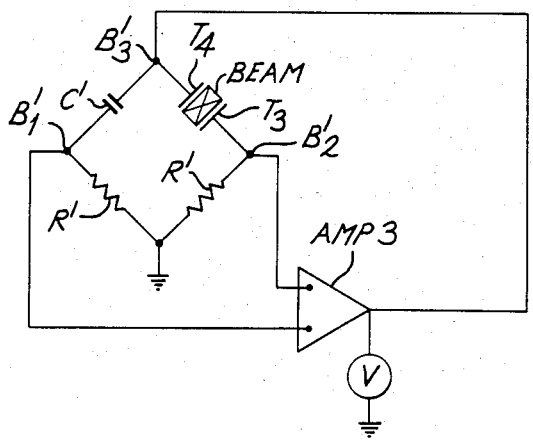

FIG. 5 shows a possible control loop. The arrangement is very similar to that shown in FIG. 4 but here negative velocity feedback is used. The terminals $T_3$ and $T_4$ are used to connect the beam to the bridge at $B'_2$ and $B'_3$ and the output taken from a difference amplifier Amp 3 provides the feedback to the bridge at point $B'_3$.

The capacitor C' and the resistors R' are chosen in the same way as for the bridge shown in FIG. 4.

Since the output from Amp 3 is proportional to the beam velocity along 0z this negative feedback voltage will damp the motion of the beam in the 0xz plane. Also, because the beam is excited at its resonant frequency the beam forces due to inertia and elasticity will cancel and the motion will be limited by internal damping in the material and the damping due to the feedback loop. Therefore, if the gain of amplifier Amp 3 is large so that the applied damping is much greater than that contributed by the material, the voltage output of Amp 3 will provide a direct measure of the applied rate of turn, so that the reading of voltmeter V will indicate the applied rate and the device as a whole will be usable as a single axis rate gyroscope.

In FIGS. 6 to 8 the sensitive structure comprises a circular stem 20 rigidly clamped at one end to a firm base 21. A disc 22 is integral with stem 20 and the pair form a axisymmetrical arrangement about the longitudinal axis 0Z. The assembly is manufactured from a single crystal of bismuth germanium oxide with the principal crystal axis 0z coincident with the longitudinal axis 0Z of the device. The other principal axes of the crystal are shown as 0x and 0y.

Four identical electrodes 23, 24, 25 and 26 are symmetrically deposited on the top face of disc 22 and are arranged with respect to the crystal axes 0x and 0y as shown in FIG. 7, the centre lines of adjacent electrodes being offset from both 0x and 0y by 45°. Similar electrodes 27–30 are deposited on the bottom face of disc 22. Electrodes 23, 25, 28 and 30 are then electrically connected to a terminal $T_5$ and 24, 26, 27 and 29 to a terminal $T_6$.

Four identical electrodes 31, 32, 33 and 34 are also deposited on the stem as shown in FIGS. 6 and 8. In this case the centre lines of adjacent electrodes are coincident with axes 0x and 0y, and their longitudinal axes are parallel to 0z. Electrodes 31 and 33 are connected to a terminal $T_7$, and 32 and 34 to a terminal $T_8$.

Disc 22 is continuously excited by applying a sinusoidal voltage across $T_5$ and $T_6$. Because of the electrode configuration and the cut of the crystal this voltage will generate an electrical field within the disc which is aligned with the axis 0z. This field will cause the disc to expand and contract radially. Thus by employing a bridge network similar to that described in FIG. 4 the disc can be made to vibrate radially at its resonant frequency and with a pre-set amplitude. The dimensions of disc 22 and stem 20 are now chosen so that the resonant frequency for torsional vibration of the stem and disc assembly about 0z is equal to the resonant frequency of disc 22 alone for radial vibration. When this matching is achieved, a rate of turn $\Omega$ applied about axis 0z will, because of the radial motion of the disc (Coriolis effect), produce resonant torsional vibrations in the stem. Because of the electrode arrangement on the stem and the piezoelectric nature of the material this torsional motion will generate a voltage across terminals $T_7$ and $T_8$. If this voltage is used to drive a control system of the type shown in FIG. 5 a measure of the applied rate can be derived.

In FIGS. 9 to 12 the sensitive structure comprises a rectangular plate 40 made from a crystal of bismuth germanium oxide. Axes 0xyz represent suitably located axes of the crystal with 0y normal to the plane of the plate and axes 0x and 0z parallel to its edges. The plate thickness is arranged to be greater in the centre region 41 than at the ends 42 and 43. The plate is supported at its ends by fixing it to some suitable foundations (not shown). It will be seen later that the nature of these foundations is not important.

The drive may be provided by electrodes 44 and 45 deposited on the top and bottom surfaces of the raised portion of the plate as shown in FIG. 10. When a voltage V is applied across terminals $T_9$ and $T_{10}$ connecting the electrodes 44 and 45 an electrical field in the 0y direction is produced which, because of the piezoelectric nature of the material, causes the plate to shear in the yz plane. The type of displacement produced is shown diagrammatically in FIG. 11 and is often termed horizontal shear (or SH).

The plate can therefore be made to resonate in a thickness horizontal shear mode by connecting terminals $T_9$ and $T_{10}$ to a bridge network similar to that of FIG. 4. The thickness a and length l of the raised portion and the thickness b of the end regions of plate 40 are chosen so as to concentrate the resonant motion in the central regions of the plate. A resonant frequency should be chosen having a value less than the cut-off frequency associated with the propagation of horizontal shear (SH) waves in the end regions of the plate. When the frequency is so chosen, it is found that motion due to the horizontal shear waves diminishes exponentially as the ends 42 and 43 of the beam are approached, and becomes negligible at the supports. The use of this property is known as "energy trapping", and permits the resonant frequency to be determined without regard to the manner in which the plate is supported. This factor is of some importance as it ensures that any damping and elasticity in the supporting structure does not influence the performance of the gyroscope.

If a rate of turn $\Omega$ is now applied about the plate normal 0y inertia forces are generated in the 0x direction as a result of the shear motion along 0z and of the Coriolis effect. These inertia forces will produce an electrical field in the 0z direction. Electrodes 46 and 47 are deposited symmetrically on the top surface of plate 40 and electrodes 48 and 49 are deposited indentically on the bottom surface. Terminals $T_{11}$ and $T_{12}$ join 46 to 48 and 47 to 49 respectively and it is the voltage generated across these terminals that is used to detect the 0z electrical field and hence the applied rate. An electrical network similar to that shown in FIG. 5 may be used to measure this voltage.

FIG. 12 shows an alternative configuration, in which electrodes 50 and 51 are deposited on the top and bottom surfaces of plate 40 roughly midway between the supported ends of the plate and are used to excite the resonance, and the pick-off electrodes 52 and 53 are deposited on the front and back edges of the plate. In the yet further alternative shown in FIG. 13 plate 40 is held at earth potential, and roughly midway between its supported ends a layered assembly is formed by bonding together metallic plates 61 and 62, piezoelectric plates 63 and 64, and the plate 40 itself. The piezoelectric properties of plate 63 are so chosen that when the voltage is applied to metallic plate 61 the layered assembly undergoes a shear motion in the yz plane, similar to that described with reference to FIG. 11. The assembly can therefore be made to resonate in a thickness shear mode by connecting plates 61 and 40 to the terminals of a bridge network like that shown in FIG. 4. As with the embodiment of the invention shown in FIG. 9 the dimensions a, l and b are chosen so that the motion is concentrated around that part of plate 40 lying centrally between its supported ends. If a rate of turn $\Omega$ is now applied about the axis 0y inertia forces will be generated in the 0x direction and these will in turn generate an electrical charge in the piezoelectric plate 64, and this charge may be used to determine the applied rate.

We claim:

1. A gyroscopic device comprising:

an elongated member of substantial length and substantially rectangular transverse section, exhibiting the piezoelectric effect and attached at at least one of its ends to supporting structure;

exciting electrodes attached to said member at a region remote from its said attachment to said fixed structure;

means using the said piezoelectric effect and said exciting electrodes to excite said region of said member into oscillations of a shearing type in which transversely-opposite faces of said member at said region oscillate in parallel directions but out-of-phase with each other, and sensing electrodes attached to said member at said region and adapted to sense electrical signals indicative of the inertia forces that are set up in said region of said member and that act along the said length of said member when a rate of turn is applied about an axis lying normal both to the said directions of said shearing oscillations and to said length of said member.

2. A gyroscopic device according to claim 1 in which said member is attached to supporting structure at both ends and said region lies substantially midway between said attached ends.

3. A gyroscopic device according to claim 1 in which said transverse section of said member is greater at said region than elsewhere.

4. A gyroscopic device according to claim 1 in which said member includes a plate held at earth potential and is of layered construction at said region, some of said layers being of material exhibiting the piezoelectric effect.

* * * * *